Nov. 2, 1954

A. BERGSON 2,693,570

VOLTAGE REGULATOR

Filed Nov. 12, 1953

INVENTOR.
ARNOLD BERGSON
BY
*Frank H. Larmor*
ATTORNEY

Nov. 2, 1954

A. BERGSON 2,693,570

VOLTAGE REGULATOR

Filed Nov. 12, 1953

INVENTOR.
ARNOLD BERGSON
BY
*Frank H. Harmon*
ATTORNEY

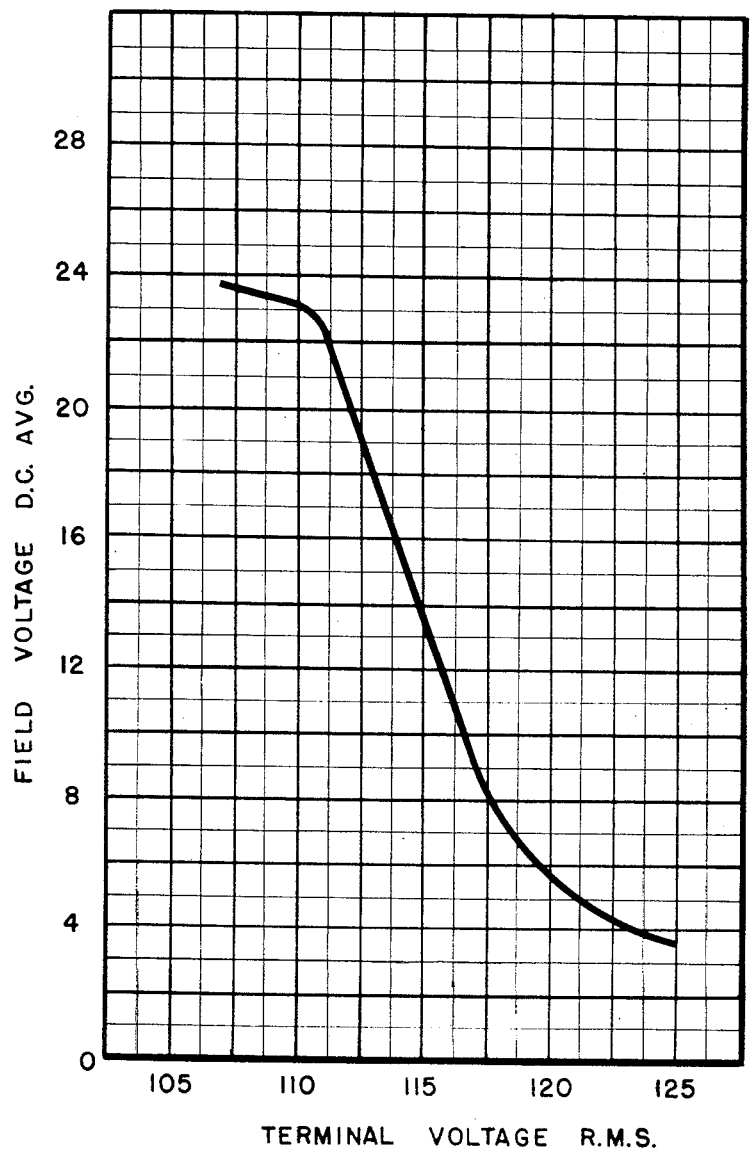

United States Patent Office 2,693,570
Patented Nov. 2, 1954

2,693,570

VOLTAGE REGULATOR

Arnold Bergson, Cleveland, Ohio, assignor to Jack & Heintz, Inc., Cleveland, Ohio, a corporation of Delaware Application November 12, 1953, Serial No. 391,620

7 Claims. (Cl. 322—28)

This invention relates to improvements in voltage regulators and has for one of its primary objects to provide an improved voltage sensing circuit that is supplied with alternating voltages of opposite polarity through secondary windings of the transformer from the alternator end of an inverter and more particularly a voltage sensing circuit that includes two sub circuits, one of which is provided with a tube through which constant voltage is supplied throughout a pulse of a predetermined period, and the other of which includes a potentiometer for conducting variable alternating voltage of opposite polarity, and in which voltage sensing circuit means are provided whereby, during the first half cycle of supply of alternating voltage, the instantaneous constant voltage of one sub circuit is subtracted from the variable voltage of the other, and in which the angle of the signal representing this subtraction of voltages is, by integration, substantially increased in length so as to constitute a marked increase in efficiency for supply to the input of the voltage amplifier of the overall voltage control, the integrated difference voltage being an average function of the instantaneous difference between the terminal voltage of the alternator and the referenced constant voltage pulse.

Recent trends in military aircraft specifications have been toward requirements of improved performance under increasingly difficult environmental conditions. These new requirements come at a time when inverter control performance and reliability is marginal under current specifications.

Present inverter voltage regulators are of three general types: electromechanical, electronic, and electronic-self saturable reactor types. The reliability, accuracy, and life of these regulators are seriously reduced by operation under conditions of shock, vibration, acceleration and high altitude.

Another basic limitation of present controls is the transient response time. In many cases accuracy of regulation is limited by response time to factors of transient stability rather than available gain.

With the foregoing and other objects in view, the invention resides in the combination of parts and in the details of construction hereinafter set forth in the following specification and appended claims, certain embodiments of which are illustrated in the accompanying drawings, in which:

Figure 4 is a graph illustrating the transfer characteristic of the voltage regulator.

Figure 1:
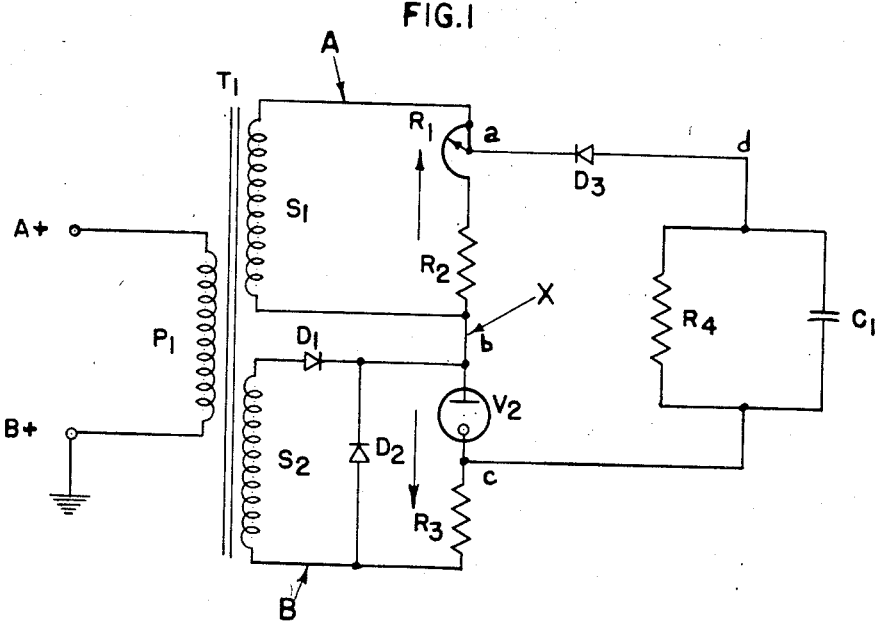
Figure 1 is a schematic view of the voltage sensing circuit.

The three functional sections of my improved regulator include a sensing circuit, a vacuum tube pulse preamplifier, and a gating transformer. Referring to Figure 1, the transformer T1 includes a primary winding P1 supplied from the alternator end of an inverter, and having two transformers S1 and S2 supply alternating voltage of opposite polarities and constitute secondaries that each form a part of a different sub circuit, generally indicated at A and B. The first sub circuit B includes secondary S2 and two selenium diodes D1 and D2, a VR tube V2, and a resistor R3. Sub circuit A includes secondary S1 of transformer T1, a potentiometer "a" and a resistor R2. The two sub circuits A and B are connected by a junction lead, generally indicated at X in Figure 1.

The sensing circuit, as shown in detail in Figure 1, is supplied with two A.-C. voltages of opposite polarity from secondary windings S1 and S2 of transformer T1, having a primary winding P1. Two selenium diodes, D1 and D2, gate the voltage from secondary S2, such that voltage of only one polarity is applied to the VR tube V2. Until the instantaneous voltage on the conducting half cycle exceeds the firing voltage, all of the voltage is applied to the tube V2. After the firing voltage has been exceeded ($\theta_1$), the tube V2 maintains a constant voltage across points B—C, until the applied voltage decreases below the minimum value required by the tube for conduction ($\theta_2$). The voltage across points b—c during the time interval from $\theta_1$ to $\theta_2$ is used as a reference bias signal. During the next half cycle the voltage is gated by the diodes such that no voltage is applied to the tube.

Figure 2:
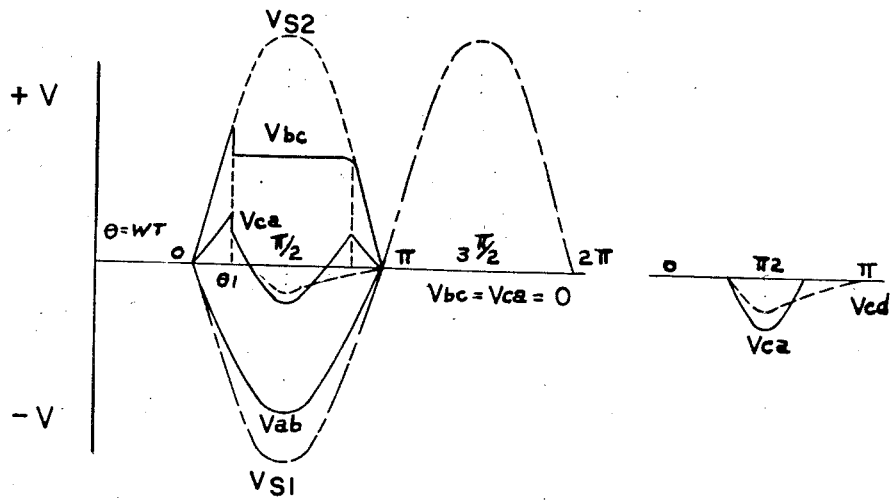
Figure 2 is a graph showing the electrical operation of the voltage sensing circuit.

On the VR tube V2 conducting half cycle, point b is positive with respect to points a and c. Therefore, the signal voltage taken across points a—c will be the instantaneous difference between Vab and Vbc, as shown in Figure 2. The adjustment potentiometer provides variation of Vab to the required fraction of the transformer secondary S1 output voltage. It will be noted that Vab is negative with respect to the grid of the tube V1a. Therefore, an increase in alternator terminal voltage will decrease the output of V1a.

The difference signal Vac is then acted on by an RC network, including resistor R4 and capacitor C1 to increase its angularity for proper application to the grid of V1a. The time constant of the RC network is 0.3 of one millisecond and therefore negligible.

The grid signal applied to V1a is negative with respect to the plate voltage supplied from secondary S3 of transformer T1 and controls the output of V1a.

Figure 3:
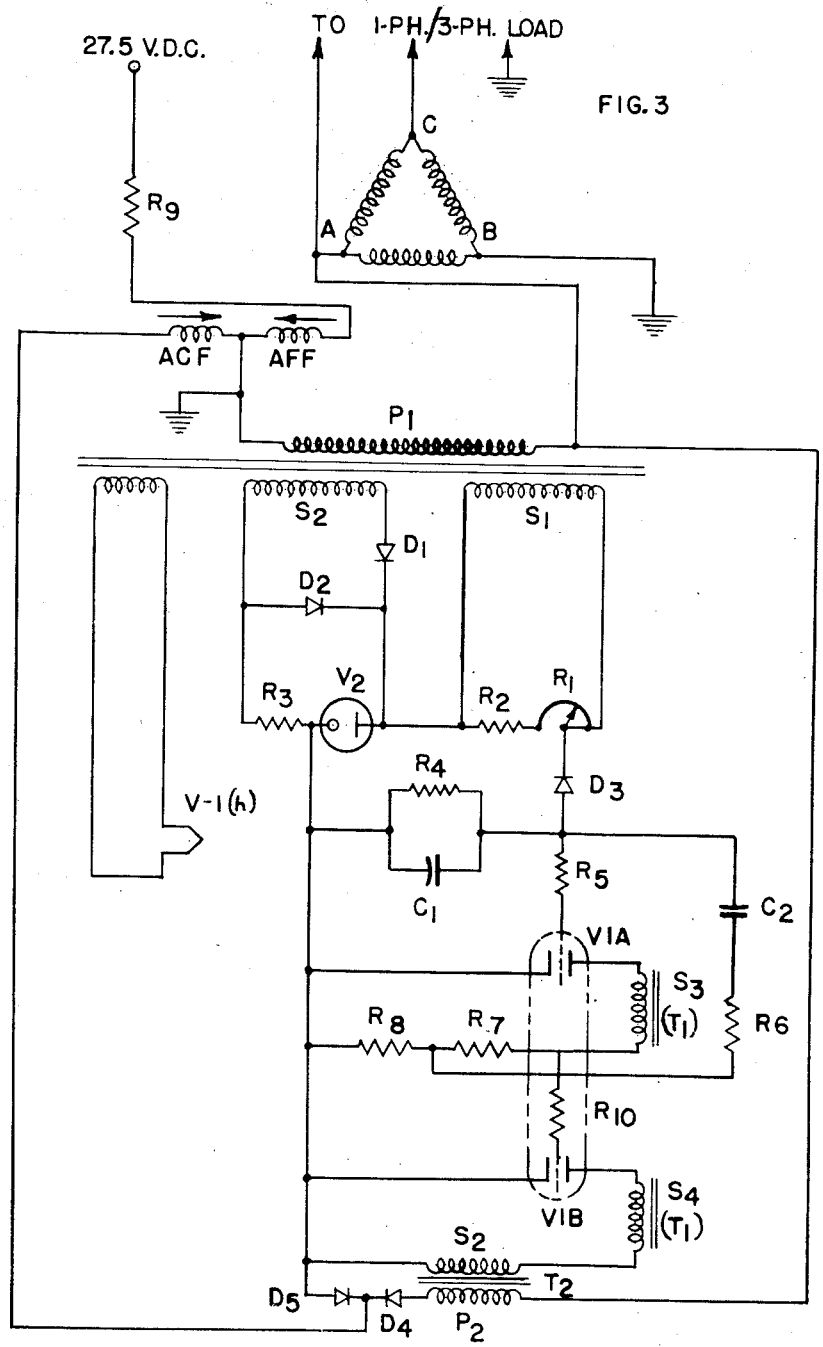
Figure 3 is a schematic diagram of the voltage regulator including the alternate end of an inverter, the voltage sensing circuit, the voltage preamplifier and the gating transformer.

The complete voltage regulator schematic diagram is shown in Figure 3, in which the two-stage vacuum tube pulse preamplifier consists of one subminiature medium mu twin triode V1, two transformer secondary supplies S3 and S4, and four quarter watt resistors R5, R8, R9 and R10. For this application the triodes are used as rectifiers as well as control elements. The first stage triode output voltage Vg2 is directly controlled by the sensing circuit output Vg1. The second stage pulse preamplifier is directly coupled to the output of the first stage across plate resistors R7, R8 and the output of the first stage Vg2, is used as a grid signal for the second stage control. A phase shift feedback path is provided through resistor R5 and capacitor C2.

The second stage pulse preamplifier supplies the gating transformer T2 control winding S2, where the half wave output is integrated for proper reset control of the gating transformer power output.

The power circuit of the gating transformer P2 is supplied from the inverter A.-C. output and supplies single phase, half wave rectified control power to an aiding control field AFC of the alternator. A complete transfer characteristic for the voltage regulator is shown in Figure 4.

The alternator has a fixed field AFF from the 28 volt D.-C. power supply and the control field AFC supplied from the voltage regulator. In starting the unit, the fixed field supplies the required field power for initial voltage buildup.

A typical phase of operation is as follows: With the unit operating at 115 volts, 400 C. P. S., no load, full load is suddenly applied to the alternator. Instantaneously, the alternator terminal voltage will drop to some new value. Sensing voltage S1 will drop proportionally thereby making the first state pulse preamplifier grid voltage less negative and increasing plate current of V1a. Since the voltage drop across resistors R7 and R8 has been increased, the grid voltage of the second stage pulse preamplifier becomes more negative and plate current through V1b is decreased. Since the control winding S2 of the gating transformer is reset by integrating the half wave output of the pulse preamplifier, the amount of available reset has been reduced, and on the half cycle following the application of load, the output of the gating transformer will be increased to some new value. Increasing the field excitation increases the terminal voltage causing the alternator to resume rated operation.

For the half wave gating transformer used, the control field 100% transient voltage response is two cycles in 400 C. P. S. power supply frequency, independent of the field time constant. Depending on which part of the gating cycle the transient condition is initiated, the full response of the voltage control will vary between one and two cycles of the operating frequency.

I claim:

1. In a voltage regulator, a voltage sensing circuit including a transformer having a primary winding and first and second secondary windings, means for supplying alternating voltages of opposite polarity from said secondary windings, a voltage regualtor tube having an anode and a cathode, a voltage blocking rectifier in series with and between the first terminal of said first secondary winding and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said second secondary winding, to constitute a second sub circuit, a junction lead between the terminal of said second secondary winding to which said fixed resistance is connected and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being through its resistor in the opposite direction.

2. In a voltage regulator, a voltage sensing circuit including a transformer having a primary winding and first and second secondary windings, means for supplying alternating voltages of opposite polarity from said secondary windings, a voltage regulator tube having an anode and a cathode, a voltage blocking rectifier in series with and between the first terminal of said first secondary winding and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said second secondary winding, to constitute a second sub circuit, a junction lead between the terminal of said second secondary winding to which said fixed resistance is connected and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being through its resistor in the opposite direction, whereby during the first half cycle of the supply of alternating voltage from said primary winding, the instantaneous constant voltage of said first sub circuit is subtracted from the variable voltage of said second sub circuit.

3. In a voltage regulator, a voltage sensing circuit including a transformer having a primary winding and first and second secondary windings, means for supplying alternating voltages of opposite polarity from said secondary windings, a voltage regulator tube having an anode and a cathode, a voltage blocking rectifier in series with and between the first terminal of said first secondary winding and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said second secondary winding, to constitute a second sub circuit, a junction lead between the terminal of said second secondary winding to which said fixed resistance is connected and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being through its resistor in the opposite direction, whereby during the first half cycle of the supply of alternating voltage from said primary winding, the instantaneous constant voltage of said first sub circuit is subtracted from the variable voltage of said second sub circuit, a resistor and a capacitor connected in parallel with each other and in series with a voltage blocking rectifier, said voltage blocking rectifier being in circuit with said potentiometer and said capacitor being in circuit with the cathode of said tube and connected in parallel with said last named resistor.

4. In a voltage regulator, a voltage sensing circuit including a transformer having a primary winding and first and second secondary windings, means for supplying alternating voltages of opposite polarity from said secondary windings, a voltage regulator tube having an anode and a cathode, a voltage blocking rectifier in series with and between the first terminal of said first secondary windings and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said second secondary winding, to constitute a second sub circuit, a junction lead between the terminal of said second secondary winding to which said fixed resistance is connected and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being through its resistor in the opposite direction, whereby during the first half cycle of the supply of alternating voltage from said primary winding, the instantaneous constant voltage of said first sub circuit is subtracted from the variable voltage of said second sub circuit, a resistor and a capacitor connected in parallel with each other and in series with a voltage blocking rectifier, said voltage blocking rectifier being in circuit with said potentiometer and said capacitor being in circuit with the cathode of said tube and connected in parallel with said last named resistor, whereby the angular conduction period is increased by integration of the signal, indicating the voltage resulting from the subtraction of the constant voltage of said first sub circuit from the variable voltage of said second sub circuit.

5. In an alternator voltage regulator, a power amplifier, and a voltage sensing circuit including a transformer having a primary winding and first and second secondary windings, means for supplying alternating voltages of opposite polarity from said secondary windings, a voltage regulator tube having an anode and a cathode, a voltage blocking rectifier in series with and between the first terminal of said first secondary windings and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said secondary winding, to constitute a second sub circuit, a junction lead between the terminal of said secondary winding to which said fixed resistance is connected, and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being in the opposite direction, the output of said voltage sensing circuit being connected to the input of said voltage amplifier.

6. In an alternator voltage regulator, a power amplifier, a voltage amplifier and a voltage sensing circuit including a transformer having a primary winding and first and second secondary windings, means for supplying alternating voltages of opposite polarity from said secondary windings, a voltage regulator tube having an anode and a cathode, a voltage blocking rectifier in series with and between the first terminal of said first secondary windings and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said secondary winding, to constitute a second sub circuit, a junction lead between the terminal of said secondary winding to which said fixed resistance is connected and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being in an opposite direction, a resistor and a capacitor connected in parallel with each other and in series with a voltage blocking rectifier, said voltage blocking rectifier being in circuit with said potentiometer and said capacitor being in circuit with the cathode of said tube and connected in parallel with said last named resistor, the output of said voltage sensing circuit being connected to the input of said voltage amplifier.

7. In an alternator voltage regulator, a power amplifier, a voltage amplifier and a voltage sensing circuit including a transformer having a primary winding and first and second secondary windings, means for supplying alternating voltages of opposite polarity from said secondary windings, a voltage regulator tube having an anode and a cathode, a voltage blocking rectifier in series with and between the first terminal of said first secondary windings and the anode of said tube, a resistor between said first secondary winding and the cathode of said tube, a second rectifier between the second terminal of said first secondary winding, to constitute a first sub circuit, a fixed resistance and a potentiometer connected to each other and to the terminals of said second secondary winding, to constitute a second sub circuit, a junction lead between the terminal of said second secondary winding to which said fixed resistance is connected and the first terminal of said first secondary winding, said junction lead being connected to the anode of said tube to connect said two sub circuits together, the instantaneous polarity of the constant voltage in said first sub circuit being in a direction through the anode of said tube and the polarity of said second sub circuit being through its resistor in the opposite direction, whereby during the first half cycle of the supply of alternating voltage from said primary winding, the instantaneous constant voltage of said first sub circuit is subtracted from the variable voltage of said second sub circuit, a resistor and a capacitor connected in parallel with each other and in series with a voltage blocking rectifier, said voltage blocking rectifier being in circuit with said potentiometer and said capacitor being in circuit with the cathode of said tube and connected in parallel with said last named resistor.

No references cited.